J. B. WILLIAMS.
Improvement in Churns.
No. 115,552. Patented May 30, 1871.
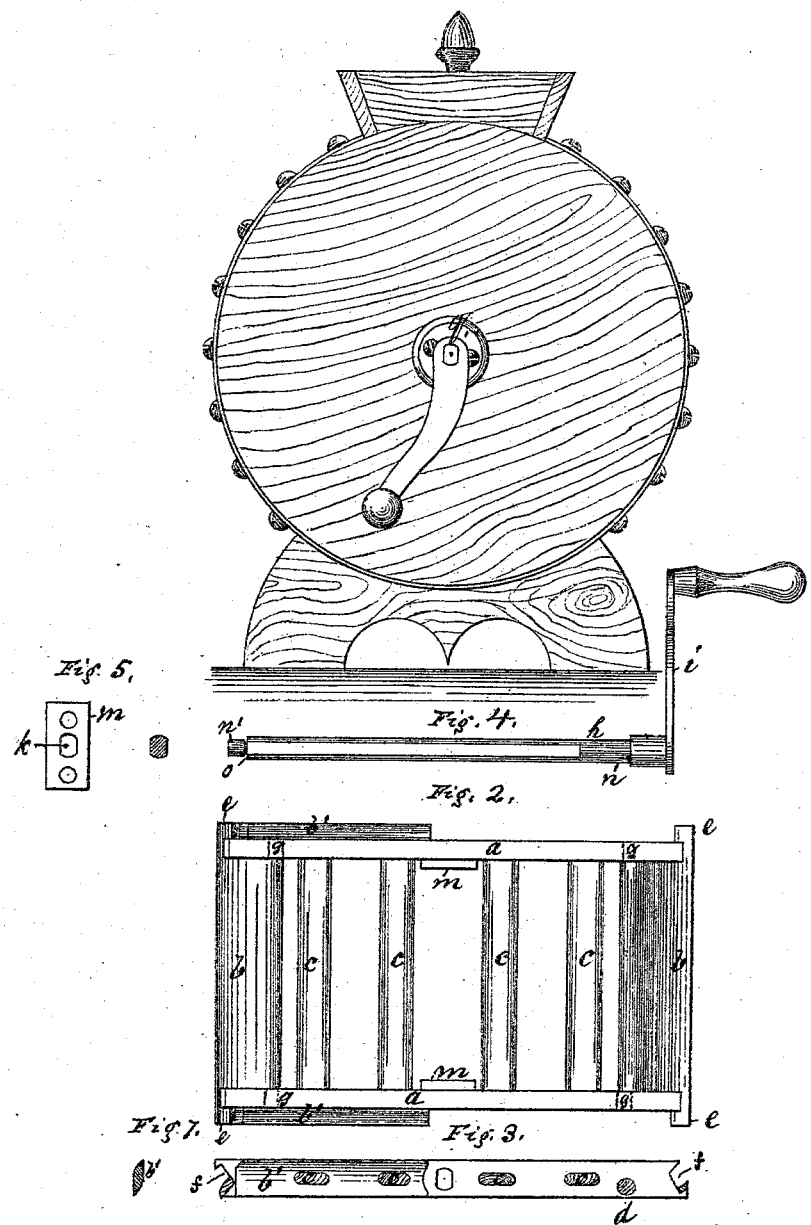

UNITED STATES PATENT OFFICE.

JAMES B. WILLIAMS, OF GLASTENBURY, CONNECTICUT.

IMPROVEMENT IN CHURNS.

Specification forming part of Letters Patent No. 115,552, dated May 30, 1872.

*To all whom it may concern:*

Be it known that I, JAMES B. WILLIAMS, of Glastenbury, county of Hartford and State of Connecticut, have invented certain new and useful Improvements in Churn and Butter-Worker; and to enable others skilled in the art to make and use the same, I will proceed to describe its construction, referring to the drawing, in which the same letters indicate like parts in each of the figures.

The nature of this invention consists in arranging oscillating beaters, workers, or clearers at the outer ends and sides of a revolving frame, so that by turning a crank in the common way it (the frame with the workers) will thoroughly agitate the cream and produce the butter; and by turning the crank in the opposite direction occasionally before the butter is brought it will wipe from the inner surface of the churn all the cream that adheres thereto, and by again turning in the usual way it will work all of the buttermilk, or nearly so, from the butter.

In the accompanying drawing, Figure 1 is a side elevation of the body of a churn, much like those in common use. Fig. 2 is a side view of the dasher. Fig. 3 is an edge view thereof. Fig. 4 is a side and section view of the spindle and crank. Fig. 5 is a side of the spindle-plate, which is secured to the outer or inner sides of the arms $a$ of the dasher. Figs. 6 and 7 are section views of the oscillating flaps $b\ b'$.

$a$ are the side arms of the dasher, united and held firmly together by the cross-bars $c$. These cross-bars also serve as beaters. $b$ are vibrating flaps, hinged by dowel-pins $g$, shown by dotted lines, which enter the orifices $d$. The outer edge of this flap is provided with projections $e$, which allow the outer edge of the flap to vibrate in the recess opening $f$, formed in the outer ends of the arms $a$. $b'$ are oscillating flaps, the shape of which, as also the flaps $b$, will be understood by reference to Figs. 6 and 7. These flaps $b'$ are provided with orifices to receive the projecting ends $c'$ of the cross-bar $c$, and allow them to oscillate freely thereon, between the arms $a$ and the sides of the vessel. $h$ is the operating-shaft or spindle, having the operating-crank $i$ arranged thereon.

Now, it will be seen that by the use of a dasher thus constructed a more effective and thorough agitation is produced, and a complete separation of the buttermilk from the butter is effected; and by turning the crank or dasher in an opposite direction occasionally before the butter is brought the edge of the flaps will wipe the cream from the sides of the churn, and by again turning in the usual way will deliver the butter in two balls almost perfectly worked free from buttermilk.

A great saving of cream is produced by the peculiar action of the vibrating flaps $b$ and the oscillating flaps $b'$, as it will be seen that by occasionally (while the cream is being agitated) reversing the action of the dasher, or by turning it occasionally backward or in an opposite direction, the outer edges, by the action of the cream, will expand, oscillate, or vibrate outward in close proximity with the sides of the churn, and wipe or scrape off all the cream from the sides of the churn, which ordinarily, with machines heretofore in use, would go to waste, thus producing a saving of about ten per cent. over those in common use.

I believe I have thus shown the nature, construction, and advantage of this invention so as to enable others skilled in the art to make and use the same therefrom.

What I claim, and desire to secure by Letters Patent, is—

The flaps $b\ b'$, arranged and operating as described, with a dasher, $a\ c$, substantially as set forth.

JAMES B. WILLIAMS. [L. S.]

Witnesses:
   E. W. BLISS,
   JEREMY W. BLISS.